United States Patent [19]
Umeki et al.

[11] 4,067,755
[45] Jan. 10, 1978

[54] METHOD OF MAKING POWDERED MAGNETIC IRON OXIDE MATERIAL

[75] Inventors: Shinji Umeki, Saku; Kazuhide Aue, Chiba; Yasumichi Tokuoka, Saku, all of Japan

[73] Assignee: TDK Electronics Company, Ltd., Tokyo, Japan

[21] Appl. No.: 616,058

[22] Filed: Sept. 23, 1975

Related U.S. Application Data

[60] Continuation-in-part of Ser. No. 483,031, June 25, 1974, abandoned, which is a division of Ser. No. 323,293, Jan. 12, 1973.

[51] Int. Cl.² .................... H01F 1/02; C22B 1/04; C01G 49/08
[52] U.S. Cl. ................... 148/105; 75/.5 AA; 252/62.56
[58] Field of Search ............ 148/103, 105, 31.55; 75/.5 AA; 252/62.55, 62.56

[56] References Cited

U.S. PATENT DOCUMENTS

| | | | |
|---|---|---|---|
| 2,651,105 | 9/1953 | Neel | 75/.5 AA |
| 3,669,643 | 6/1972 | Bagley et al. | 75/.5 AA |
| 3,702,270 | 11/1972 | Kawasaki et al. | 148/105 |
| 3,720,618 | 3/1973 | Toda et al. | 252/62.56 |
| 3,748,270 | 7/1973 | Hwang | 252/62.56 |

*Primary Examiner*—Walter R. Satterfield
*Attorney, Agent, or Firm*—Staas & Halsey

[57] ABSTRACT

A method of producing a powder magnetic material for use as a magnetic recording medium is disclosed. More particularly, the disclosed powder magnetic material is adapted to provide a magnetic recording medium of low electrical resistance. In particular, an alloy of cobalt and at least one element selected from the group consisting of vanadium, molybdenum, copper, maganese, nickel, zinc and iron are deposited onto the surface of particles of magnetic iron oxides such as $Fe_3O_4$ or $\gamma Fe_2O_3$. Powdered magnetic material of high coercivity, high magnetic flux density and low electrical resistance is obtained.

9 Claims, No Drawings

METHOD OF MAKING POWDERED MAGNETIC IRON OXIDE MATERIAL

RELATED APPLICATIONS

This application is a continuation-in-part application of copending U.S. patent application Ser. No. 483,031, filed June 25, 1974 (now abandoned); which is a divisional application of copending U.S. patent application Ser. No. 323,293 filed Jan. 12, 1973.

BACKGROUND OF THE INVENTION

1. Field of the Invention

This invention relates to a powder magnetic material for use as a magnetic recording medium, and more particularly, to a powder magnetic material adapted to obtain a magnetic recording medium of low electrical resistance.

2. Description of the Prior Art

It is known to use a material such as $\gamma$-$Fe_2O_3$, a magnetic material. However, $\gamma$-$Fe_2O_3$ cannot satisfy the desired requirement for the characteristics of a recording medium, where a high coercivity and high magnetic flux density are required.

Moreover, besides high coercivity and high magnetic flux density, low electrical resistance is also required for magnetic powder material.

For instance, electrostatic charges are induced on the surface of a magnetic tape by friction when the tape is running, so that is cannot run smoothly and dust is attracted to the magnetic tape with the result that dropout is induced and the S/N ratio is decreased due to accidental noise.

It is known that the above-mentioned production of electrostatic charges can be decreased by using a low resistance magnetic tape.

Thus, in the conventional magnetic tape, a surface active agent or carbon is added to the magnetic paint. The dispersibility of magnetic paint, however, is deteriorated by such additions and the output power of the magnetic recording is decreased in by the addition of carbon.

SUMMARY OF THE INVENTION

An object of this invention is to provide a low electric resistance powder magnetic material.

Another object of this invention is to provide a low electrical resistance magnetic recording medium.

A further object of this invention is to provide a new and improved method of producing such a material or medium.

In accordance with the teachings of this invention, there is provided an alloy of cobalt and at least one element selected from the group consisting of vanadium, molybdenum, copper, manganese, nickel, zinc and iron to be deposited onto the surface of particles of magnetic iron oxides. The resulting magnetic material is characterized by high coercivity, high magnetic flux density and low electrical resistance.

This invention will be more fully understood by the following descriptions.

PREFERRED EMBODIMENTS OF THE INVENTION

Now, there will be described various examples of the methods of producing the magnetic material of this invention:

EXAMPLE 1

About 25 grams of spiculate or needle-shaped (accicular) magnetite whose major axis is about 0.5 and whose axis ratio is about 6 to 8 is dispersed (slurried) into a solution so as to be reacted at 100° C for an hour, the composition of the solution being as follows:

| Composition of Solution | |
|---|---|
| $CoCl_2 \cdot 6H_2O$ | 6 g |
| $Na_2C_4H_4O_6 \cdot 2H_2O$ | 50 g |
| $H_3BO_4$ | 20 g |
| $NaHPO_2 \cdot H_2O$ | 24 g |
| $H_2O$ | 500 ml |
| $CuCl_2 \cdot 2H_2O$ | 2 g |

The pH value of the solution is adjusted to 9.0 ± (0.1) in 5N-NaOH solution. After the product is washed with water and dried, the substance is heat-treated in a nitrogen atmosphere at 300° C for an hour. The magnetic properties and electrical resistance of the produce obtained were measured.

Table 1 below shows the measured values of various materials, wherein the column labeled No. 1 denotes pure magnetite $Fe_3O_4$ before treatment in accordance with the teachings of this invention, column No. 2 denotes magnetite containing cobalt only, and column No. 3 denotes magnetite containing deposited alloy of cobalt and copper in accordance with this invention.

Table 1

| | material | | No. 1 | No. 2 | No. 3 |
|---|---|---|---|---|---|
| coercive force | Hc | (Oe) | 390 | 544 | 520 |
| residual magnetic flux density | Br/ρ | (G . cm³/g) | 485 | 525 | 514 |
| saturated magnetic flux density | Bm/ρ | (G . cm³/g) | 970 | 1072 | 1040 |
| rectangular ratio | Br/Bm | | 0.50 | 0.49 | 0.49 |
| electrical resistance | R | (Ω) | $1 \times 10^8$ | $1 \times 10^{10}$ | $1 \times 10^6$ |
| amount of deposited metals | Co | (wt. %) | 0 | 5.0 | 3.0 |
| | Cu | | 0 | 0 | 0.4 |

As shown in table 1, the electrical resistance of material of No. 3 is lower than that of materials No. 1 and 2 because of the addition of copper. The coercive force and magnetic flux density are also much improved by said addition.

Through the amount of deposited metals is shown individually as Co or Cu in table 1, it denotes chemically analyzed results, and Co and Cu were actually deposited in the form of an alloy. Such expression is used in the same manner in the other examples.

The measurement of electrical resistance is carried out by the following method:

Powder magnetic material is packed into a glass tube having a diameter of 4mm and a length of 60mm. The powder is packed to a density of about 0.7 g/cm³. Mercury electrodes are attached to both ends of the glass tube, and the resistance measurement is carried out by an electrometer.

Magnetic characteristics are measured by a self-recording flux meter under the condition that H max was 5000 Oe.

These measuring methods are used in other examples in the same manner.

EXAMPLE 2

In this example, manganese is utilized instead of copper in Example 1, and the magnetic properties and electrical resistance of the resultant powder magnetic material (No. 4) produced by the same method as the method of the example 1, are shown in table 2 below.

Table 2

|  | material | | No. 4 |
|---|---|---|---|
| coercive force | Hc | (Oe) | 608 |
| residual magnetic flux density | Br/ρ | (G . cm³/g) | 543 |
| saturated magnetic flux density | Bm/ρ | (G . cm³/g) | 1083 |
| rectangular ratio | Br/Bm | | 0.50 |
| electrical resistance | R | (Ω) | 1×10⁷ |
| amount of deposited metals | Co | (wt %) | 1.5 |
| | Mn | | 0.3 |

As shown in table 2, the electrical resistance is decreased by the addition of manganese, in comparison with the characteristics of the materials No. 1 and No. 2 as shown in table 1; and high coercive force and high magnetic flux density of material No. 4 are obtained.

Thus, the effect of manganese is substantially the same as that of copper.

EXAMPLE 3

About 50 grams of spiculate magnetite, whose major axis is about 0.5μ and whose axis ratio is about 6 to 8, is dispersed into a solution to be reached at 70° C for an hour, the composition of the solution being as follows:

| Composition of solution | |
|---|---|
| CoCl₂ . 6H₂O | 5 g |
| Rochell salt | 13 g |
| hydrazine hydrate | 25 g |
| H₂O | 500 ml |
| ZnCl₂ | 2 g |

In this example, zinc is used instead of copper (Example 1) or manganese (Example 2). The pH value of the solution is adjusted to be about 12.0 in 5N-NaOH.

Table 3 shows the measured values of magnetic characteristics and electrical resistance of the obtained powder magnetic material.

Table 3

|  | material | | No. 5 | No. 6 |
|---|---|---|---|---|
| coercive force | Hc | (Oe) | 560 | 450 |
| residual magnetic flux density | Br/ρ | (G . cm³/g) | 453 | 430 |
| saturated magnetic flux density | Bm/ρ | (G . cm³/g) | 914 | 900 |
| rectangular ratio | Br/Bm | | 0.50 | 0.48 |
| electrical resistance | R | (Ω) | 1×10⁷ | 1×10⁹ |
| amount of deposited metals | Co | (wt %) | 4.0 | 1.0 |
| | Zn | | 3.0 | 4.0 |

As shown in the table 3, the electrical resistance of the materials Nos. 5 and 6 is smaller than that of materials Nos. 1 and 2. The decrease in electrical resistance results from the addition of zinc. The electrical resistance of the material No. 6, however, shows a rather high value, 1×10⁹, and hence zinc should not be added more than 3 wt%.

EXAMPLE 4

23 grams of spiculate magnetite whose major axis is about 0.5μ and whose axis ratio is about 6 to 8 are dispersed into a solution, the compositions of the solutions being shown in the table 4, and the pH value of the solution being adjusted to 12.5 in 5N-NaOH solution. The total volume of the mixture of magnetite and the solution is about 500 ml and the mixture is reached at 100° C for 2 hours.

TABLE 4

| material | | No.7 | No. 8 | No.9 | No. 10 |
|---|---|---|---|---|---|
| 0.1 mol CoCl₂ solution | (ml) | 30 | 60 | 90 | 120 |
| Rochelle salt | (g) | 2.0 | 4.0 | 6.0 | 800 |
| 1% hydro-boron sodium | (ml) | 3 | 6 | 9 | 12 |
| NH₄VO₃ | (g) | 0.35 | 0.35 | 0.35 | 0.35 |
| (NH₄)₆Mo₇O₂₄ . 4H₂O | (g) | 2.5 | 2.5 | 2.5 | 2.5 |
| Fe₃O₄ | (g) | 23 | 23 | 23 | 23 |

The product obtained is filtered, washed and dried, and then heat-treated at 400° C for an hour in a nitrogen atmosphere so that powder magnetic material is obtained. The magnetic properties and electrical resistance of the product is shown in table 5.

Table 5

|  | material | | No.7 | No. 8 | No. 9 | No. 10 |
|---|---|---|---|---|---|---|
| coercive force | Hc | (Oe) | 520 | 612 | 704 | 564 |
| residual magnetic flux density | Br/ρ | (G . cm³/g) | 515 | 519 | 517 | 563 |
| saturated magnetic flux density | Bm/ρ | (G . cm³/g) | 1080 | 1077 | 1061 | 1074 |
| rectangular ratio | Br/Bm | | 0.48 | 0.48 | 0.49 | 0.52 |
| electrial resistance | R | (Ω) | 7.2×10⁵ | 3.4×10⁵ | 1.3×10⁵ | 4.2×10⁵ |
| amount of deposited metals | V | (wt %) | 0.10 | 0.25 | 0.44 | 0.20 |
| | Mo | | 0.05 | 0.11 | 0.07 | 0.20 |
| | Co | | 0.65 | 1.06 | 1.51 | 2.15 |

As shown in the table 5, the addition of vanadium and molybdenum summed to at least 0.15 wt% is effective to decrease the electrical resistance.

Though vanadium and molybdenum are added together in this example, a single addition of vanadium or molybdenum is also effective.

EXAMPLE 5

25 grams of spiculate magnetite whose major axis is about 0.5μ and whose axis ratio is about 6 to 8, is dispersed into a solution and heated at 100° C for an hour to be reacted. The compositions of the various solutions are shown in table 6.

Table 6

| material | | No. 12 | No. 13 | No. 14 |
|---|---|---|---|---|
| CoSO₄ . 7H₂O | (g) | 4.5 | 4.5 | 4.5 |
| NaHPO₂ . H₂O | (g) | 13.5 | 13.5 | 13.5 |
| Na₂C₄H₄O₆ . 2H₂O | (g) | 57.5 | 57.5 | 57.5 |
| H₃BO₄ | (g) | 16.0 | 16.0 | 16.0 |
| H₂O | (ml) | 500 | 500 | 500 |
| NH₄VO₃ | (g) | 0.5 | 1.0 | 2.0 |
| γ-Fe₂O₃ | (g) | 25 | 25 | 25 |

The pH value of the solution is adjusted to 9.0 ± (0.1) in 5N-NaOH solution.

The product obtained is filtered, washed and dried, and then heat-treated at 350° C in a nitrogen atmosphere for an hour. The magnetic properties and electric resistance of thus-obtained powder magnetic material is measured and the results are shown in table 7.

Table 7

| | | | material | No. 11 | No. 12 | No. 13 | No. 14 |
|---|---|---|---|---|---|---|---|
| coercive force | Hc | (Oe) | | 416 | 544 | 576 | 512 |
| residual magnetic flux density | Br/ρ | (G·cm³/g) | | 476 | 540 | 558 | 519 |
| saturated magnetic flux density | Bm/ρ | (G·cm³/g) | | 939 | 905 | 910 | 909 |
| rectangular ratio | Br/Bm | | | 0.507 | 0.597 | 0.613 | 0.571 |
| electrical resistance | R | (Ω) | | $1 \times 10^{10}$ | $2.4 \times 10^7$ | $1 \times 10^7$ | $2 \times 10^7$ |
| amount of deposited metals | Co | (wt %) | | 0 | 1.56 | 1.56 | 1.50 |
| | V | | | 0 | 1.02 | 1.02 | 1.20 |

As shown in the table 7, the electrical resistance of the materials Nos. 12 to 14, which contain vanadium, is much smaller than that of material No. 11, which is composed of only γ-Fe₂O₃. Thus, a reduced electrical resistance is obtained by the addition of vanadium.

EXAMPLE 6

The magnetic properties and electrical resistance of powder magnetic material produced by the same method as the method described in the example 5, with the exception of using iron instead of vanadium, are shown in table 8.

Table 8

| | | material | No. 15 | No. 16 | No. 17 |
|---|---|---|---|---|---|
| coercive force | Hc | (Oe) | 544 | 530 | 524 |
| residual magnetic flux density | Br/ρ | (G·cm³/g) | 521 | 511 | 501 |
| saturated magnetic flux density | Bm/ρ | (G·cm³/g) | 975 | 975 | 976 |
| rectangular ratio | Br/Bm | | 0.534 | 0.524 | 0.503 |
| electrical resistance | R | (Ω) | $9 \times 10^8$ | $6 \times 10^8$ | $1 \times 10^8$ |
| amount of deposited metals | Co | (wt %) | 2.71 | 1.74 | 1.33 |
| | Fe | | 0.4 | 0.8 | 1.1 |

As shown in the table 8, the effect of the addition of iron is substantially the same as that of vanadium (example 5), the electrical resistance being decreased in comparison with the material No. 11.

Thus, the electrical resistance of the material of this invention is $10^5 \sim 10^8 \Omega$ while that of the original material $Fe_3O_4$ or $Fe_2O_3$ is $10^8 \Omega$ or $10^{10} \Omega$, respectively.

The amount of added alloying elements is limited to 3% or less by weight. The reason of this restriction is as follows:

The electrical resistance of the material containing 3 wt% of zinc is low, e.i. $1 \times 10^7 \Omega$, as shown in the example 4, while if 4 wt% of zinc is added a relatively high value of $1 \times 10^9 \Omega$ is realized. In the latter case, the coercive force and magnetic flux density are also decreased. Therefore, the addition of zinc has an upper limit. The deposition of cobalt is markedly decreased as the deposition of other elements is increased, which results in the decrease of Hc and Br.

Therefore, if it is desired that the electrical resistance be kept very low, the coercive force higher than 500 Oe and the residual magnetic flux density higher than 450 G·cm³/g, then the amount of added substances has to be confined to 3% by weight.

Thus, powder magnetic material which has low electrical resistance, high coercivity and high remanence can be obtained according to this invention. It will be easily understood that the electrical resistance of the magnetic medium made of such low electrical resistance powder magnetic material is also low.

Magnetic tapes were manufactured from the materials of Examples 1 and 2 (materials Nos. 2 and 4). In particular, a powdered magnetic material produced by Examples 1 and 2, dispersing agents and lacquer were mixed by a dispersing machine to provide a magnetic paint.

This magnetic paint was applied to a 3μ thick polyester film by an applicator whose gap width was 2 mil so as to form a magnetic film coating on the polyester film. After drying, the coated film was cut into test pieces 50mm wide and 100mm long. The electrical resistance of these test pieces were measured by an electrometer along its length. The results obtained are shown in table 9.

Table 9

| | electrical resistance (Ω) |
|---|---|
| $Fe_3O_4$ | $3.5 \times 10^8$ |
| $\gamma = Fe_2O_3$ | $1 \times 10^{10}$ |
| $Fe_3O_4$ containing Co and Cu | $2 \times 10^7$ |
| $Fe_3O_4$ containing Co and Mo | $7 \times 10^7$ |
| $Fe_3O_4$ containing Co | $7 \times 10^9$ |

As shown in table 9, a magnetic tape having a low electrical resistance is obtained, and it is understood that the advantageous aspects of this invention are maintained effective as well as the powder magnetic material. Though the above example is shown in the form of the magnetic tape, similar results may be obtained with a magnetic disk or sheet, etc.

Chlorides were used as metalic salts in the examples, but sulfates, nitrates or salts of organic acid can be used alternatively in the same manner. Proper reducing agents other than that used in the examples can be also used.

The electrical resistance of the powder magnetic material is greatly reduced by this invention, and in contrast to conventional methods, carbon is not added upon production of the magnetic tape and hence the amount of magnetic powder contained in the tape can be increased so that the magnetic properties are improved.

Numerous changes may be made in the different embodiments of the invention without departing from the spirit thereof; therefore, it is intended that all matter contained in the foregoing description shall be interpreted as illustrative and not in a limiting sense.

We claim:

1. A method for making a powdered magnetic material comprising the steps of:
    slurrying acicular magnetic iron oxide particles, of a type selected from the group consisting of γ-Fe₂O₃ and Fe₃O₄, in an aqueous solution, having a pH in the range of 8 to 12.5, containing ions of cobalt and ions selected from at least one of the group consisting of Va, Mo, Cu, Mn, Ni, Zn and Fe;

reducing the ions to deposit a substantially uniform coating of an alloy on said iron oxide particles, said alloy comprising about 0.65 to 4 wt% of Co, based on the weight of said iron oxide, and about 0.15 to 3 wt%, of said at least one selected element based on the weight of said iron oxide; heat treating said coated iron oxide particles in an atmosphere consisting essentially of nitrogen gas at a temperature in a range of about 300° to 400° C to obtain said powdered magnetic material of high coercivity, high magnetic flux density and low electrical resistance.

2. The method of claim 1, wherein $Fe_3O_4$ is selected and slurried in said aqueous solution.

3. The method of claim 2, wherein said iron oxide particles are needle-shaped and have a major axis of about 0.5μ with an axis ratio of about 6 to 8.

4. The method of claim 1, wherein ions of Cu are selected and said deposited alloy comprises about 3 wt% Co and about 0.4 wt% Cu.

5. The method of claim 1 wherein ions of Mn are selected and said deposited alloy comprises about 1.5 wt% Co and 0.3 wt% Mn.

6. The method of claim 1, wherein ions of Zn are selected and said deposited alloy comprises about 4 wt% Co and 3 wt% Zn.

7. The method of claim 1, wherein ions of V and Mo are selected and said deposited alloy comprises about 0.65–2.15 wt% Co, 0.10–0.44 wt% V, and 0.05–0.2 wt% Mo.

8. The method of claim 1, wherein said acicular magnetic iron oxide particles of the $\gamma\text{-}Fe_2O_3$ type are selected, ions of V are selected and said deposited alloy comprises at least 1.5 wt% Co and at least 1.02 wt% V.

9. The method of claim 1, wherein said acicular magnetic iron oxide particles of the $\gamma\text{-}Fe_2O_3$ type are selected, ions of Fe are selected and said deposited alloy comprises at least 1.33–2.71 wt% Co and 0.4–1.1 wt% Fe.

* * * * *

UNITED STATES PATENT AND TRADEMARK OFFICE
CERTIFICATE OF CORRECTION

PATENT NO. : 4,067,755
DATED : January 10, 1978
INVENTOR(S) : Shinji Umeki et al It is certified that error appears in the above-identified patent and that said Letters Patent are hereby corrected as shown below:

Column 1, line 30, "is" (1st Occurrence) should be -- it --;

Column 2, in the first table, all "." should be -- · -- (raised);

Column 2, Table 1, line 40, "deposted" should be -- deposited --;

Column 2, Table 1, both occurrences, "(G.cm$^3$/g)" should be -- (G·cm$^3$/g) --;

Column 3, Table 2, both occurrences, "(G.cm$^3$/g)" should be -- (G·cm$^3$/g) --;

Column 3, line 42, "CoCl$_2$ . 6H$_2$O" should be -- CoCl$_2$ · 6H$_2$O --;

Column 3, line 43, "Rochell" should be -- Rochelle --;

Column 3, line 57, "(G.cm$^3$/g " should be -- (G·cm$^3$/g) --;

Column 3, line 58, "(G.cm$^3$/g)" should be -- (G·cm$^3$/g) --;

Column 4, line 19, "(NH$_4$)$_6$MO$_7$O$_{24}$ . 4H$_2$O" should be -- (NH$_4$)$_6$MO$_7$O$_{24}$ · 4H$_2$O --;

Column 4, Table 5, both occurrences, "(G.cm$^3$/g)" should be -- (G·cm$^3$/g) --;

Column 4, Table 6, in all solutions "." should be -- · --;

UNITED STATES PATENT AND TRADEMARK OFFICE
CERTIFICATE OF CORRECTION

PATENT NO. : 4,067,755
DATED : January 10, 1978
INVENTOR(S) : Shinji Umeki et al It is certified that error appears in the above-identified patent and that said Letters Patent are hereby corrected as shown below:

Column 5, Table 7, "(G.cm$^3$/g)" should be -- (G·cm$^3$/g) -- both occurrences;

Column 5, Table 8, "(G.cm$^3$/g)" should be -- (G·cm$^3$/g) -- both occurrences;

Column 5, line 50, "e.i." should be -- i.e. --;

Column 6, line 55, after "the" insert -- above described apparatus and the --;

Column 6, line 56, after "invention" insert -- may be made --;

Column 6, line 58, after "description" insert -- and in the accompanying drawings --.

Column 6, Table 9, "$\gamma=Fe_2O_3$" should be -- $\gamma-Fe_2O_3$ --;

Column 6, line 68, "Va" should be -- V --.

Signed and Sealed this

Sixth Day of June 1978

[SEAL]

Attest:

RUTH C. MASON
Attesting Officer

DONALD W. BANNER
Commissioner of Patents and Trademarks